United States Patent
Kim et al.

(10) Patent No.: US 9,136,508 B2
(45) Date of Patent: Sep. 15, 2015

(54) SECONDARY BATTERY WITH ENHANCED CONTACT RESISTANCE

(71) Applicant: LG Chem, Ltd., Seoul (KR)

(72) Inventors: Seong-Yong Kim, Daejeon (KR); Ji-Hyun Kim, Daejeon (KR); Han-Ho Lee, Seoul (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 13/937,543

(22) Filed: Jul. 9, 2013

(65) Prior Publication Data

US 2013/0295444 A1    Nov. 7, 2013

Related U.S. Application Data

(63) Continuation of application No. PCT/KR2012/005249, filed on Jul. 2, 2012.

(30) Foreign Application Priority Data

Jun. 30, 2011   (KR) .................. 10-2011-0064471
Jul. 2, 2012    (KR) .................. 10-2012-0071826

(51) Int. Cl.
*H01M 2/02*     (2006.01)
*H01M 2/26*     (2006.01)
*H01M 2/30*     (2006.01)
*H01M 10/04*    (2006.01)
*H01M 10/052*   (2010.01)
*H01M 10/058*   (2010.01)

(52) U.S. Cl.
CPC .............. *H01M 2/02* (2013.01); *H01M 2/0212* (2013.01); *H01M 2/266* (2013.01); *H01M 2/30* (2013.01); *H01M 10/0436* (2013.01); *H01M 10/052* (2013.01); *H01M 10/058* (2013.01)

(58) Field of Classification Search
None
See application file for complete search history.

(56) References Cited

U.S. PATENT DOCUMENTS

2003/0193317 A1   10/2003   Shimamura et al.
2004/0023108 A1   2/2004    Nakanishi et al.
(Continued)

FOREIGN PATENT DOCUMENTS

EP    2026403 A2     2/2009
JP    2001-052681    2/2001
(Continued)

OTHER PUBLICATIONS

International Search Report for Application No. PCT/KR2012/005249 dated Dec. 14, 2012.
(Continued)

*Primary Examiner* — Patrick Ryan
*Assistant Examiner* — Haixia Zhang
(74) *Attorney, Agent, or Firm* — Lerner, David, Littenberg, Krumholz & Mentlik, LLP

(57) ABSTRACT

A secondary battery is configured to reduce contact resistance by improving structures of an electrode tab and a lead. The secondary battery with enhanced contact resistance includes an electrode assembly in which a cathode plate having a cathode tab, an anode plate having an anode tab and a separator are stacked alternately, a battery case accommodating the electrode assembly, and an anode lead electrically connected to the anode tab, wherein the battery case is sealed while accommodating the electrode assembly, and the anode lead and the cathode tab are exposed out of the battery case.

7 Claims, 5 Drawing Sheets

(56) References Cited

U.S. PATENT DOCUMENTS

| | | |
|---|---|---|
| 2007/0082265 A1* | 4/2007 | Itou et al. ............... 429/223 |
| 2007/0154794 A1 | 7/2007 | Kim et al. |
| 2007/0202399 A1* | 8/2007 | Shin et al. ............... 429/181 |
| 2009/0023062 A1 | 1/2009 | Kim |
| 2009/0197162 A1 | 8/2009 | Shinyashiki et al. |
| 2010/0255368 A1* | 10/2010 | Park et al. ............... 429/185 |
| 2010/0285352 A1* | 11/2010 | Juzkow et al. ........... 429/163 |
| 2011/0081574 A1 | 4/2011 | Jo et al. |
| 2011/0143177 A1* | 6/2011 | Jeon et al. ............... 429/61 |

FOREIGN PATENT DOCUMENTS

| | | | |
|---|---|---|---|
| JP | 2002134094 | A | 5/2002 |
| JP | 2002313314 | A | 10/2002 |
| JP | 2003303583 | A | 10/2003 |
| JP | 2004-039651 | | 2/2004 |
| JP | 2005276459 | A | 10/2005 |
| JP | 2007115478 | A | 5/2007 |
| JP | 2007184267 | A | 7/2007 |
| JP | 2009026739 | A | 2/2009 |
| JP | 2009087611 | A | 4/2009 |
| JP | 2010114364 | A | 5/2010 |
| JP | 2011077041 | A | 4/2011 |
| KR | 20070047377 | A | 5/2007 |
| KR | 20070049553 | A | 5/2007 |
| KR | 20080036250 | A | 4/2008 |
| KR | 2009-0003823 | A | 1/2009 |
| KR | 2009-0088761 | A | 8/2009 |
| KR | 20100043727 | A | 4/2010 |
| KR | 2010-0091372 | A | 8/2010 |
| KR | 10-1029020 | B1 | 4/2011 |
| WO | 2008002024 | A1 | 1/2008 |
| WO | 2008013371 | A1 | 1/2008 |

OTHER PUBLICATIONS

Supplementary European Search Report and Opinion from application No. EP 12 803 565.6, dated Oct. 17, 2014.

* cited by examiner

# SECONDARY BATTERY WITH ENHANCED CONTACT RESISTANCE

CROSS-REFERENCE TO RELATED APPLICATION

The present application is a continuation of International Application No. PCT/KR2012/005249 filed on Jul. 2, 2012, which claims priority to Korean Patent Application No. 10-2011-0064471 filed on Jun. 30, 2011, and Korean Patent Application No. 10-2012-0071826 filed on Jul. 2, 2012 in the Republic of Korea, the disclosures of which are incorporated herein by reference.

TECHNICAL FIELD

The present disclosure relates to a secondary battery with an enhanced electric structure, and more particularly, to a secondary battery configured to reduce contact resistance by improving structures of an electrode tab and a lead.

BACKGROUND ART

Generally, a secondary battery refers to a rechargeable battery, while a primary battery refers to a non-rechargeable battery. Secondary batteries are widely used for electric vehicles or electronic devices such as cellular phones, notebook computers, video cameras or the like. In particular, a lithium secondary battery has an operating voltage of about 3.6 V, triple the capacity of nickel-cadmium batteries or nickel hydrogen batteries generally used as power sources of electronic devices, and due to its high energy density per unit weight, are being utilized more and more.

The lithium secondary battery generally uses lithium oxide and carbonaceous material as cathode active material and anode active material, respectively. The lithium secondary battery includes a cell assembly configured by integrating unit cells, in each of which a cathode plate and an anode plate respectively coated with the cathode active material and the anode active material are disposed with a separator being interposed between them, and an exterior case which seals and accommodates the cell assembly together with an electrolytic solution.

Depending on the shape of the battery case, the lithium secondary battery may be classified into a can type secondary battery in which the cell assembly is included in a metal can and a pouch type battery in which the cell assembly is included in a pouch case of an aluminum laminate sheet.

The pouch-type secondary battery has low production costs and high energy density, and a large-capacity battery pack may be easily configured by connecting such pouch-type secondary batteries in series or in parallel. For this reason, the pouch-type secondary battery is in the spotlight as a power source of an electric vehicle or a hybrid vehicle.

In the pouch-type secondary battery, a cell assembly connected to a plate-shaped electrode lead is sealed in the pouch case together with an electrolytic solution. The electrode lead is partially exposed out of the pouch case, and the exposed portion of the electrode lead is electrically connected to a device to which a secondary battery is mounted or used for electrically connecting secondary batteries to each other.

FIG. 1 is an exploded perspective view showing a conventional pouch-type lithium secondary battery, and FIG. 2 is a perspective view showing an appearance of the conventional pouch-type lithium secondary battery.

Referring to FIGS. 1 and 2, the conventional pouch-type lithium secondary battery 10 includes an electrode assembly 30, a plurality of electrode tabs 40, 50 extending from the electrode assembly 30, electrode leads 60, 70 welded to the electrode tabs 40, 50, and a pouch package 20 accommodating the electrode assembly 30. The electrode assembly 30 is a power generation unit in which a cathode and an anode are stacked in order with a separator being interposed between them. The electrode assembly may have a stacking structure, a jelly-roll structure or a stacking/folding structure.

A secondary battery including the jelly-roll type electrode assembly 30 is disclosed in, for example, Korean Unexamined Patent Publication No. 2009-88761 (entitled "Secondary battery including a jelly-roll type electrode assembly") and Korean Unexamined Patent Publication No. 2007-47377 (entitled "Rectangular secondary battery including a jelly-roll type electrode assembly"). In addition, the electrode assembly 30 of a stacking/folding structure or a secondary battery including the electrode assembly 30 are disclosed in, for example, Korean Unexamined Patent Publication No. 2008-36250 (entitled "Mixed stacking and folding electrode assembly and a secondary battery having the same) and Korean Patent Registration No. 0987300 (entitled "Stacking-folding electrode assembly and its manufacturing method).

The electrode tabs 40, 50 respectively extend from corresponding electrode plates of the electrode assembly 30. The electrode leads 60, 70 are electrically connected by welding to a plurality of electrode tabs 40, 50 extending from each electrode plate and coupled to the pouch package 20 so that they are partially exposed outwards. The pouch package 20 is made of a soft package material such as an aluminum laminate sheet. The pouch package 20 has a space in which the electrode assembly 30 may be accommodated, and has an overall pouch shape.

When welding the electrode tabs 40, 50 and the electrode leads 60, 70, an ultrasonic welding technique ensuring a good heat-affected zone (HAZ) and easily applied to weld a thin metal foil is generally used. The ultrasonic welding generates ultrasonic vibrations of 10 kHz to 75 kHz and welds metals by using frictional heat caused by the ultrasonic vibrations between the metals. In other words, if an ultrasonic welding machine applies ultrasonic vibrations to the electrode tabs 40, 50 and the electrode leads 60, 70 which are in contact, frictional heat is generated at the contact surface between the electrode tabs 40, 50 and the electrode leads 60, 70, and the electrode tabs 40, 50 and the electrode leads 60, 70 are welded by means of the frictional heat.

Meanwhile, the cathode structures 40, 60 and the anode structures 50, 70 are generally made of materials with different properties. Here, the cathode structures 40, 60 are generally made of aluminum and the anode structures 50, 70 are generally made of copper or nickel-plated copper. In other words, the cathode tab 40 and the cathode lead 60 are made of aluminum, and the anode tab 50 and the anode lead 70 are made of copper or nickel-plated copper.

In the conventional lithium secondary battery 10, aluminum is used for the cathode as described above. At this time, aluminum has an oxidation potential of 1.39V and is unstable in a thermodynamic aspect. For this reason, aluminum oxide $Al_2O_3$ stable in a thermodynamic aspect is generally applied to the surface of the cathode. This oxide is stable in the air and thus has a resistance against a corrosive reaction. However, aluminum oxide does not have electric conductivity since it has no free electrons. Therefore, even though the cathode lead and the cathode tab are surface-treated to solve the above problem in the conventional art, resistance increases due to low electric conductivity, which causes additional heating during a charging/discharging reaction.

If the aluminum cathode is oxidized to deteriorate electric conductivity and the deteriorated electric conductivity increases heating due to the increased resistance, side reactions occur in the battery, which deteriorates the performance of the lithium secondary battery.

DISCLOSURE

Technical Problem

The present disclosure is designed to solve the problems of the prior art, and therefore the present disclosure is directed to providing a secondary battery, which is more useful as a high-capacity secondary battery and may strongly cope with the increase of resistance, partial heating, and resultant deterioration of performance by improving an electric connection structure between an electrode lead and an electrode tab adopted in the secondary battery.

Other objects and advantages of the present disclosure will be understood from the following description and become more apparent by embodiments of the present disclosure. In addition, it could be easily understood that the objects and advantages of the present disclosure can be implemented by means and their combinations defined in the claims.

Technical Solution

In one aspect of the present disclosure, there is provided a secondary battery with enhanced contact resistance, which includes an electrode assembly in which a cathode plate having a cathode tab, an anode plate having an anode tab and a separator are stacked alternately; a battery case accommodating the electrode assembly; and an anode lead electrically connected to the anode tab, wherein the battery case is sealed while accommodating the electrode assembly, and the anode lead and the cathode tab are exposed out of the battery case.

In particular, a portion of the cathode tab, which is exposed out of the sealed battery case, may be plated with metal having higher electric conductivity than the cathode tab.

Preferably, a portion of the cathode tab, which is exposed out of the sealed battery case, may be plated with copper.

Meanwhile, the secondary battery may further include a cathode lead electrically connected to the cathode tab exposed out of the sealed battery case.

Further, the cathode lead may be made of copper.

In addition, the cathode lead may have a bus bar form.

Preferably, the cathode lead may be electrically connected to the cathode tab by welding.

Moreover, when the battery case is sealed, an insulative film may be attached to a contact portion of the anode lead and the cathode tab.

In particular, the battery case may be sealed while accommodating the electrode assembly and being filled with an electrolytic solution.

Meanwhile, the cathode plate and the cathode tab may be made of aluminum, and the anode plate and the anode tab may be made of copper.

The cathode tab may be formed by stacking a plurality of electrode tabs respectively connected to the cathode plate, and the plurality of electrode tabs may be adhered to each other by welding in a stacked state.

Moreover, the plurality of electrode tabs may be adhered by means of linear welding which is performed to traverse the electrode tabs along the width direction thereof, and the cathode tab may have at least one linear adhesion area.

In addition, the plurality of electrode tabs may be adhered by means of point welding.

Preferably, when the battery case is sealed, an adhesion portion of the cathode tab may be located to be included in an adhesion surface of the battery case which is contacted by the cathode tab.

Advantageous Effects

According to the present disclosure, since an aluminum cathode tab of a secondary battery is configured to expose out of a battery case and copper is plated to the exposed cathode tab, it is possible to prevent resistance from increasing due to oxidation of aluminum and therefore reduce heating.

In addition, since the cathode tab and the anode tab in the battery case containing an electrolytic solution are made of different materials, an oxidation/reduction potential effect is maintained. In addition, it is possible to reduce contact resistance and solve a heating problem by plating copper or welding a copper lead to a portion of the cathode tab, which is exposed out of the battery case.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings in which.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
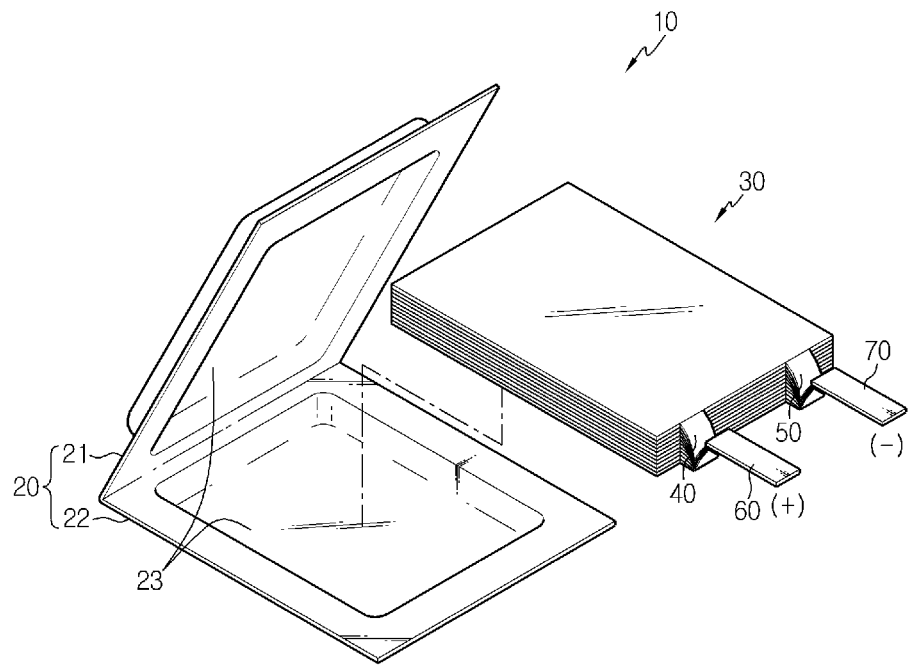
FIG. 1 is an exploded perspective view showing a conventional pouch-type lithium secondary battery.
Figure 2:
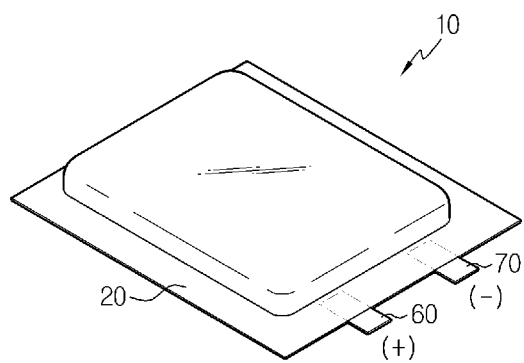
FIG. 2 is a perspective view showing an appearance of a conventional pouch-type lithium secondary battery.
Figure 3:
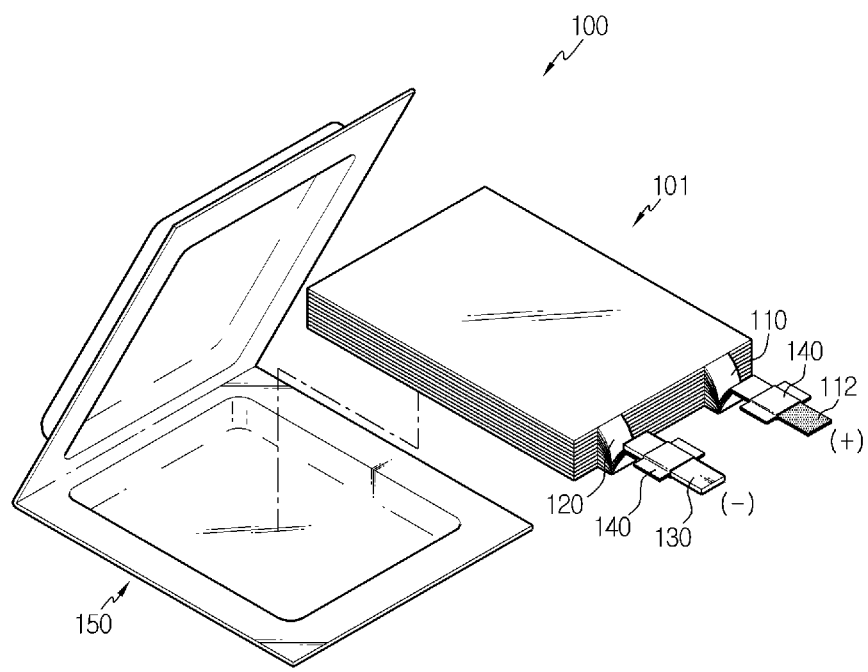
FIG. 3 is an exploded perspective view showing an inner configuration of a secondary battery with enhanced contact resistance according to an embodiment of the present disclosure.
Figure 4:
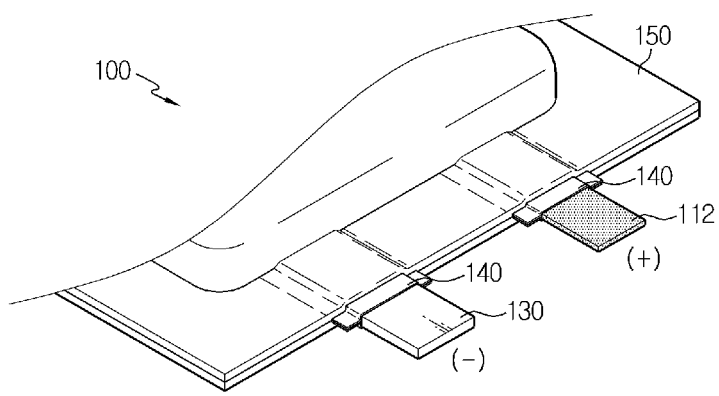
FIG. 4 is a partially enlarged view showing an electrode lead of the secondary battery with enhanced contact resistance according to an embodiment of the present disclosure.
Figure 5:
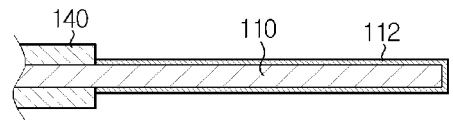
FIG. 5 is a partial sectional view showing a cathode tab exposed out of the secondary battery with enhanced contact resistance according to an embodiment of the present disclosure.

FIG. 3 is an exploded perspective view showing an inner configuration of a secondary battery with enhanced contact resistance according to an embodiment of the present disclosure, FIG. 4 is a partially enlarged view showing an electrode lead of the secondary battery with enhanced contact resistance according to an embodiment of the present disclosure, and FIG. 5 is a partial sectional view showing a cathode tab exposed out of the secondary battery with enhanced contact resistance according to an embodiment of the present disclosure.

Referring to FIGS. 3 to 5, a secondary battery 100 with enhanced contact resistance according to the present disclosure includes an electrode assembly 101, a cathode tab 110 and an anode tab 120 serving as electrode tabs, an anode lead 130 serving as an electrode lead, an insulative film 140 and a battery case 150.

In the electrode assembly 101, as described above, a cathode plate, an anode plate and a separator of a predetermined shape interposed between the cathode plate and the anode plate are stacked alternately. In addition, as described above, on occasions, the electrode assembly 101 may be applied in various ways, for example in a winding structure, a stacking structure, a stacking/folding structure or the like.

The cathode plate is generally made of aluminum (Al). In addition, the cathode plate may be made of stainless steel, nickel (Ni), titanium (Ti), baked carbon (C), aluminum (Al), or stainless steel whose surface is treated with carbon, nickel, titanium, silver (Ag) or the like, and any material having high conductivity without causing a chemical change to a secondary battery may be used without limitation.

At least one cathode tab 110 is provided at a partial region of the cathode plate. The cathode tab 110 may be formed by elongating the cathode plate or coupling a conductive member to a certain portion of the cathode plate by means of welding. In addition, the cathode tab 110 may also be made in various ways, for example by coating a part of the outer circumference of the cathode plate with a cathode material and then drying the same.

The anode plate which is a counterpart to the cathode plate is generally made of copper (Cu). In addition, the anode plate may be made of stainless steel, aluminum (Al), nickel (Ni), titanium (Ti), baked carbon (C), copper, stainless steel whose surface is treated with carbon, nickel, titanium, silver or the like, aluminum-cadmium alloy or the like.

The anode plate may have a finely uneven structure on its surface, similar to the cathode plate, in order to reinforce the bonding ability of the active material. In addition, the anode plate may be in various forms, for example in the form of a film, a foil, a porous body, a foaming body, a non-woven fabric or the like.

The anode plate also has at least one anode tab 120 in a partial region. Here, similar to the cathode tab 110 described above, the anode tab 120 may be formed by elongating the anode plate or coupling a conductive member to a certain portion of the anode plate by means of welding. In addition, the anode tab 120 may also be made in various ways, for example by coating a part of the outer circumference of the anode plate with an anode material and then drying the same.

At least one cathode tab 110 and at least one anode tab 120 are provided at each polarity, and such electrode tabs 110, 120 converge in a certain direction. The cathode tab 110 should be elongated for external connection, and the anode tab 120 is electrically connected to the anode lead 130.

The secondary battery 100 according to the present disclosure prevents the increase of contact resistance or heating, caused by charging/discharging of high current. When the cathode tab 110 is exposed out, in order to prevent oxidation of aluminum and deterioration of electric conductivity, the cathode tab 110 is elongated to the outside without connecting a lead made of aluminum to the cathode tab 110 made of aluminum (Al). At this time, in a region of the cathode tab 110 elongated outwards, the other portion which will expose out of the battery case 150 to be sealed is provided with a plating portion 112 plated with metal having high electric conductivity.

In addition, in the case the battery case 150 is sealed, the electrode assembly 101 is accommodated in the battery case 150 and the battery case 150 is filled with an electrolytic solution. At this time, if the cathode tab 110 and the anode tab 120 are made of different materials in the electrolytic solution, an oxidation/reduction potential difference may be maximized, and side reactions caused by the use of the same material may be prevented.

Therefore, according to the secondary battery 100 of the present disclosure, in a region sealed together with the electrolytic solution in the battery case 150, the anode tab 120 made of copper is connected to the anode lead 130, and the cathode tab 110 made of aluminum is present solely without being connected to a lead. By using this configuration, since the anode tab 120 and the anode lead 130 made of copper are formed with a different material from the cathode tab 110 made of aluminum, the oxidation/reduction potential difference may be maximized In addition, since a cathode lead made of aluminum is not separately adhered to the cathode tab 110, contact resistance may be reduced.

Along with it, the cathode tab 110 exposed out of the battery case when the battery case 150 is sealed is plated with metal having high electric conductivity such as copper, thereby forming the plating portion 112. Meanwhile, the anode lead 130 made of copper and exposed out of the battery case is used without change. Therefore, since both the cathode tab 110 having the plating portion 112 exposed out of the battery case and the anode lead 130 are made of copper with high electric conductivity, it is possible to prevent deterioration of electric conductivity caused by metal oxidation.

Here, even though it has been described that the plating portion 112 is plated with copper having high electric conductivity, the plating portion 112 may also be made of various kinds of materials such as gold, platinum, silver or the like, which has high electric conductivity and ensures low oxidation reaction by the air, without being limited to copper.

In addition, at a portion where the cathode tab 110 and the anode lead 130 come into contact when the battery case 150 is sealed, the insulative film 140 is attached. The insulative film 140 plays a role of enhancing an adhesive force between the cathode tab 110 and the anode lead 130, made of metallic material, and the battery case 150, made of non-metallic insulative material, and reinforcing sealing. Further, for good adhesion to the insulative film 140, the anode lead 130 may be made of nickel-plated copper.

Hereinafter, various embodiments of the cathode employed in the secondary battery according to the present disclosure will be described with reference to FIG. 6.

Figure 6:
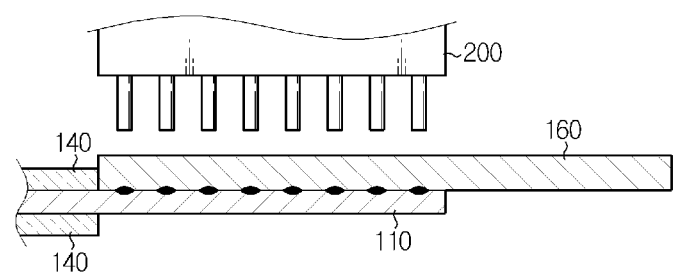
FIG. 6 is a partial sectional view showing a cathode of a secondary battery according to another embodiment of the present disclosure.

FIG. 6 is a partial sectional view showing a cathode of a secondary battery according to another embodiment of the present disclosure.

This embodiment may be applied to an anode tab and an anode lead identically or similarly. Therefore, the cathode plate, the anode plate, the electrode assembly and the battery case as well as the anode tab and the anode lead, described above, may be applied identically in this embodiment.

Referring to FIG. 6, in the secondary battery according to another embodiment of the present disclosure, a cathode lead 160 is adhered to the cathode tab 110 which is exposed outwards when the battery case 150 is sealed.

The cathode lead 160 is adhered to one side of the cathode tab 110, exposed out of the sealed battery case, by welding and electrically connected to the cathode tab 110. In addition, the cathode lead 160 is adhered to the exposed cathode tab 110 by means of ultrasonic welding by using an ultrasonic welding machine 200.

Though it is illustrated that the cathode leads 160 are adhered to one side of the cathode tab 110, the present disclosure is not limited thereto, and the cathode leads 160 may be respectively adhered to both sides of the cathode tab 110, exposed out of the insulative film 140, by welding. By doing so, it is possible to prevent oxidation reaction of metal, which may occur when the cathode tab 110 made of aluminum comes into contact with the air.

Moreover, the cathode lead 160 adhered to the cathode tab 110 is preferably made of metal with high electric conductivity. For example, the cathode lead 160 may be made of copper.

Further, the cathode lead 160 adhered to the cathode tab 110 may have a bus bar form. In other words, the other ends of the cathode lead 160 and the anode lead 130, exposed outwards, may have a bus bar form, which facilitates easier connection of electrodes between different secondary batteries or between a secondary battery and another electronic device. At this time, the cathode lead 160 having a bus bar form is also made of copper with high electric conductivity.

Figure 7:
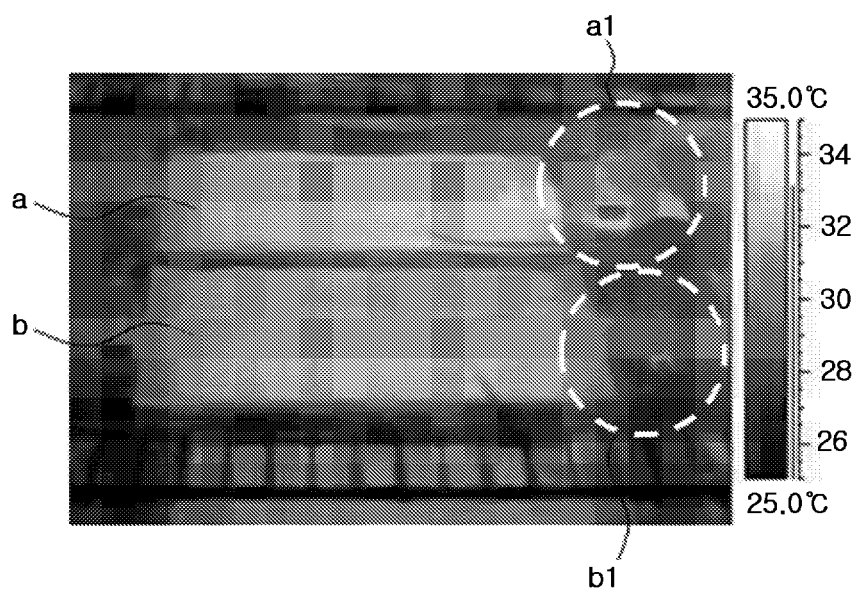
FIG. 7 is infrared (IR) photographs showing a conventional secondary battery and a secondary battery with enhanced contact resistance according to an embodiment of the present disclosure.
Figure 8:
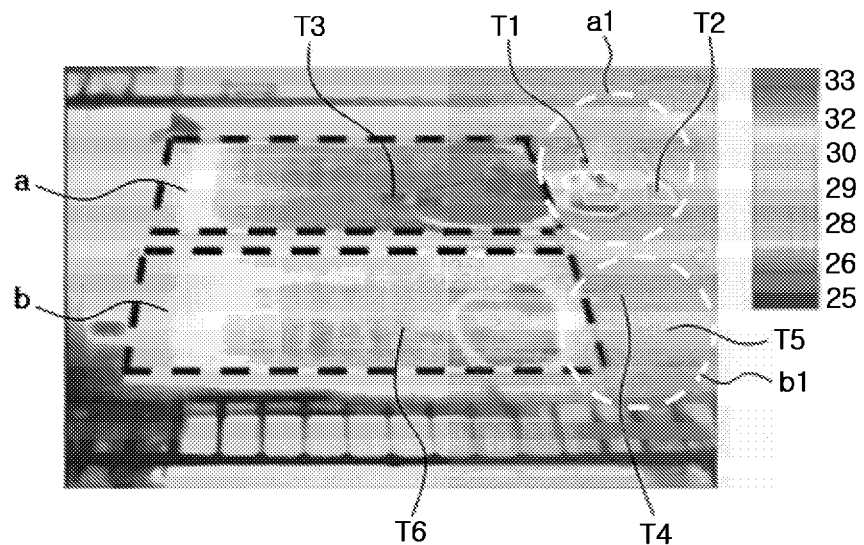
FIG. 8 is a dat file converted from the IR photographs of the conventional secondary battery and the secondary battery with enhanced contact resistance according to an embodiment of the present disclosure.

FIG. 7 is infrared (IR) photographs showing a conventional secondary battery and the secondary battery with enhanced contact resistance according to an embodiment of the present disclosure, and FIG. 8 is a dat file converted from the IR photographs of the conventional secondary battery and the secondary battery with enhanced contact resistance according to an embodiment of the present disclosure.

Referring to FIGS. 7 and 8, first, the secondary battery of the present disclosure is depicted in a region indicated by (b) and the conventional secondary battery is depicted in a region indicated by (a). In addition, a portion (b1) and a portion (a1) respectively designate electrode connection portions of the secondary battery according to the present disclosure and the conventional secondary battery.

In the figures, it may be found that the secondary battery (b) in which the cathode tab exposed out of the battery case is plated with copper or a cathode lead made of copper is adhered thereto as in the embodiment of the present disclosure has relatively smaller heating than the conventional secondary battery (a) using a cathode lead made of aluminum. This is because the contact resistance of the secondary battery according to the present disclosure is lowered than that of the conventional secondary battery.

Referring to FIG. 8, it may be found that heating of the electrode portion (b1) of the secondary battery (b) according to the embodiment of the present disclosure is clearly different from heating of the electrode portion (a1) of the conventional secondary battery (a). In addition, it may also be found through experiments that the quantity of heat transferred to the electrode assembly in the secondary battery of the present disclosure is also different from that of the conventional secondary battery, and therefore the performance of the secondary battery of the present disclosure is different from that of the conventional secondary battery (temperatures at main points in the figure: T1=33, T2=32, T3=33, T4=29, T5=28, T6=32). The performance at high-temperature cycles of the secondary battery according to the present disclosure has improved by about 10% in comparison to the conventional secondary battery.

Along with it, contact resistance at the case in which the cathode lead 160 made of copper is welded to the cathode tab 110 exposed out of the battery case according to an embodiment of the present disclosure and contact resistance at the conventional case using a cathode lead made of aluminum were measured through experiments. The measured contact resistance values are shown in the table below.

TABLE 1

| Cathode lead | Contact resistance (mΩ) | Note |
| --- | --- | --- |
| Aluminum (before welding) | 20 to 1,000 | Resistance has changed greatly |
| Aluminum (welded) | 5.95 | Comparative example |
| Copper (welded) | 0.24 | Embodiment |

As shown in Table 1, if copper is welded to the cathode lead according to an embodiment of the present disclosure, it may be found that the contact resistance at the electrode portion is greatly lowered in comparison to the conventional secondary battery using aluminum as a cathode lead.

As described above, the increase of resistance caused by oxidation of aluminum, which is a problem occurring at a conventional secondary battery using aluminum as a cathode lead, may be solved by using a cathode lead made of copper or plated with copper as in the embodiment of the present disclosure. In addition, side reactions caused by an oxidation/reduction potential difference, which occurs when both a cathode tab and an anode tab are made of copper with high electric conductivity in the battery case filled with an electrolytic solution, may also be solved in the present disclosure since the cathode tab made of aluminum and the anode tab made of copper use different materials.

Therefore, according to the present disclosure, it is possible to provide a secondary battery which may prevent the increase of resistance, caused by oxidation of aluminum in contact with the air, and the deterioration of performance, caused by heating.

Figure 9:
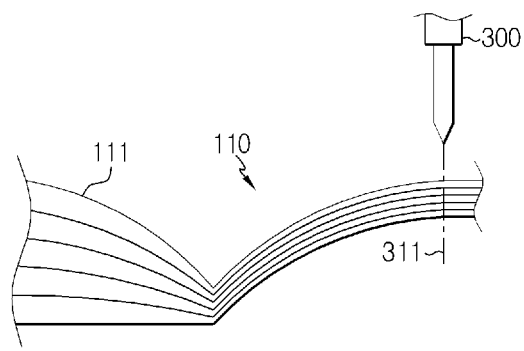
FIG. 9 is a schematic view for illustrating a process of welding a cathode tab of the secondary battery with enhanced contact resistance according to an embodiment of the present disclosure.
Figure 10:
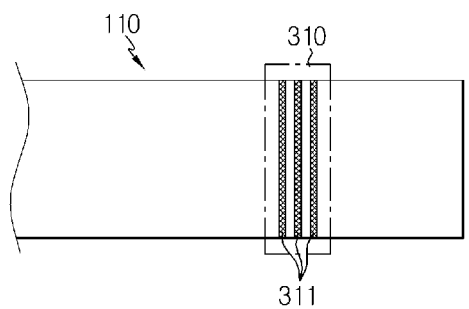
FIG. 10 is a schematic view showing a welding portion of the cathode tab of the secondary battery with enhanced contact resistance according to an embodiment of the present disclosure.
Figure 11:
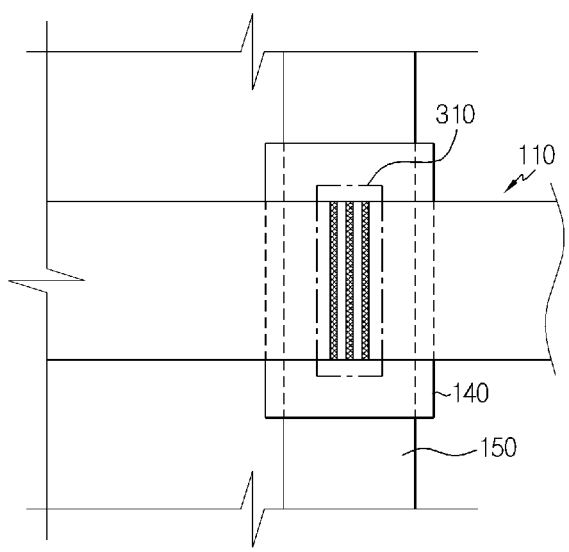
FIG. 11 is a schematic view for illustrating a process of adhering the cathode tab and a battery case of the secondary battery with enhanced contact resistance according to an embodiment of the present disclosure.

FIG. 9 is a schematic view for illustrating a process of welding a cathode tab of the secondary battery with enhanced contact resistance according to an embodiment of the present disclosure, FIG. 10 is a schematic view showing a welding portion of the cathode tab of the secondary battery with enhanced contact resistance according to an embodiment of the present disclosure, and FIG. 11 is a schematic view for illustrating a process of adhering the cathode tab and a battery case of the secondary battery with enhanced contact resistance according to an embodiment of the present disclosure.

Referring to FIGS. 9 to 11, a cathode tab employed in the secondary battery with enhanced contact resistance according to an embodiment of the present disclosure will be described.

As shown in the figures, the cathode tab 110 of the secondary battery according to the present disclosure includes a plurality of electrode tabs 111 which are stacked and respectively connected to the cathode plate.

The cathode tab 110 in which the plurality of electrode tabs 111 are stacked is welded by ultrasonic waves by using the ultrasonic welding machine 300 in a stacked state, so that the electrode tabs 111 contact each other. The ultrasonic welding generally adopts point welding to allow the stacked electrode tabs 111 to contact each other. Preferably, the ultrasonic welding adopts linear welding to allow the stacked electrode tabs 111 to contact each other. If the linear welding is performed using the ultrasonic welding machine 300, as shown in FIG. 10, a linear adhesion area 311 is formed to traverse the electrode tab 111 along the width direction thereof. The linear welding is performed at least once in the width direction of the electrode tab 111 or the cathode tab 110 and preferably performed to form a plurality of adhesion areas 311.

The adhesion portion 310 of the cathode tab 110 in which the plurality of adhesion areas 311 are formed prevents the electrolytic solution from flowing through the stacked electrode tabs 111. In other words, the adhesion portion 310 formed at the cathode tab 110 by linear welding seals the electrode tabs 111 from each other and thus prevents the electrolytic solution in the battery case 150 from leaking out.

Moreover, when the battery case 150 is assembled, the cathode tab 110 is arranged so that the adhesion portion 310 formed by linear welding is located at an adhesion surface to which the battery case 150 is adhered. In other words, in the cathode tab 110 exposed out of the battery case 150, the adhesion portion 310 formed by linear welding is located at a contact portion between the cathode tab 110 and the battery case 150. In addition, an insulative film 140 may be interposed at a location where the adhesion surface of the battery case 150 intersects the cathode tab 110. By this configuration, the battery case 150 may be sealed more tightly.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A secondary battery, comprising:
an electrode assembly in which a cathode plate having a cathode tab, an anode plate having an anode tab, and a separator are stacked alternately;
a battery case accommodating the electrode assembly; and
an anode lead electrically connected to the anode tab,
wherein the cathode tab is defined by an elongate extension of the cathode plate integrally formed therewith, and wherein the anode tab is defined by an elongate extension of the anode plate integrally formed therewith,
wherein the battery case is sealed with the electrode assembly accommodated therein, the anode lead is exposed out of the battery case, and the cathode tab is exposed out of the battery case without being connected to a cathode lead,
wherein the cathode tab is plated with a metal plating layer having higher electric conductivity than the cathode tab, the metal plating layer being disposed on only a portion of the cathode tab which is exposed out of the battery case,
wherein the cathode tab is defined by a stack of a plurality of electrode tabs respectively connected to the cathode plate, and
wherein the plurality of electrode tabs are adhered to each other by a linear weld extending along a width direction of the stack.

2. The secondary battery according to claim 1, wherein the metal plating layer is made of copper.

3. The secondary battery according to claim 1, wherein when the battery case is sealed, an insulative film is attached to a contact portion of the anode lead and the cathode tab.

4. The secondary battery according to claim 1, wherein the sealed battery case is filled with an electrolytic solution.

5. The secondary battery according to claim 1, wherein the cathode plate and the cathode tab are made of aluminum, and the anode plate and the anode tab are made of copper.

6. The secondary battery according to claim 1, wherein the cathode tab has at least one linear adhesion area.

7. The secondary battery according to claim 1, wherein when the battery case is sealed, an adhesion portion of the cathode tab is located to be included in an adhesion surface of the battery case which is contacted by the cathode tab.

* * * * *